United States Patent [19]

Blazic et al.

[11] Patent Number: 4,927,108

[45] Date of Patent: May 22, 1990

[54] CUP HOLDER

[75] Inventors: Leonard J. Blazic, Washington; Robert J. Janosko, Bloomfield Hills, both of Mich.

[73] Assignee: Chrysler Corporation, Highland Park, Mich.

[21] Appl. No.: 379,037

[22] Filed: Jul. 13, 1989

[51] Int. Cl.⁵ ............................................. A47K 1/08
[52] U.S. Cl. ................................ 248/311.2; 224/281; 312/246
[58] Field of Search ............................ 248/311.2, 291; 224/281, 273, 274, 278, 148; 296/37.9, 37.1, 37.8, 37.11, 37.12, 37.5; 312/204, 333, 330 R, 246; 211/13, 74

[56] References Cited

U.S. PATENT DOCUMENTS

| | | |
|---|---|---|
| D. 191,444 | 10/1961 | Schwartz . |
| D. 256,279 | 8/1980 | Huggins . |
| 2,112,471 | 3/1938 | Sevelle . |
| 2,660,180 | 11/1953 | Endicott et al. ................ 224/281 X |
| 3,132,892 | 5/1974 | Stevens . |
| 3,319,633 | 5/1967 | Glidden ......................... 312/204 X |
| 3,637,184 | 1/1972 | O'Brien ........................ 248/311.2 X |
| 3,712,235 | 1/1973 | Russ . |
| 4,286,742 | 9/1981 | Pellegrino ............................ 224/281 |
| 4,527,696 | 7/1985 | Harris et al. . |
| 4,733,908 | 3/1988 | Dykstra ............................... 297/194 |
| 4,738,423 | 4/1988 | DiFilippo ....................... 248/291 X |
| 4,826,058 | 5/1989 | Nakayama ..................... 224/281 X |

Primary Examiner—J. Franklin Foss
Attorney, Agent, or Firm—Edward P. Barthel

[57] ABSTRACT

The present invention is a cup holder adapted for use in a vehicle. The cup holder includes a retainer having a cavity adapted to receive an ashtray and means forming front and rear laterally spaced tracks. The cup holder also includes a plate member having front and rear edges and a cup receiving means. The front and rear edges further include means for operatively engaging the front and rear tracks of the retainer for movement between a first position adjacent the ashtray and a second position over the cavity when the ashtray is removed.

4 Claims, 1 Drawing Sheet

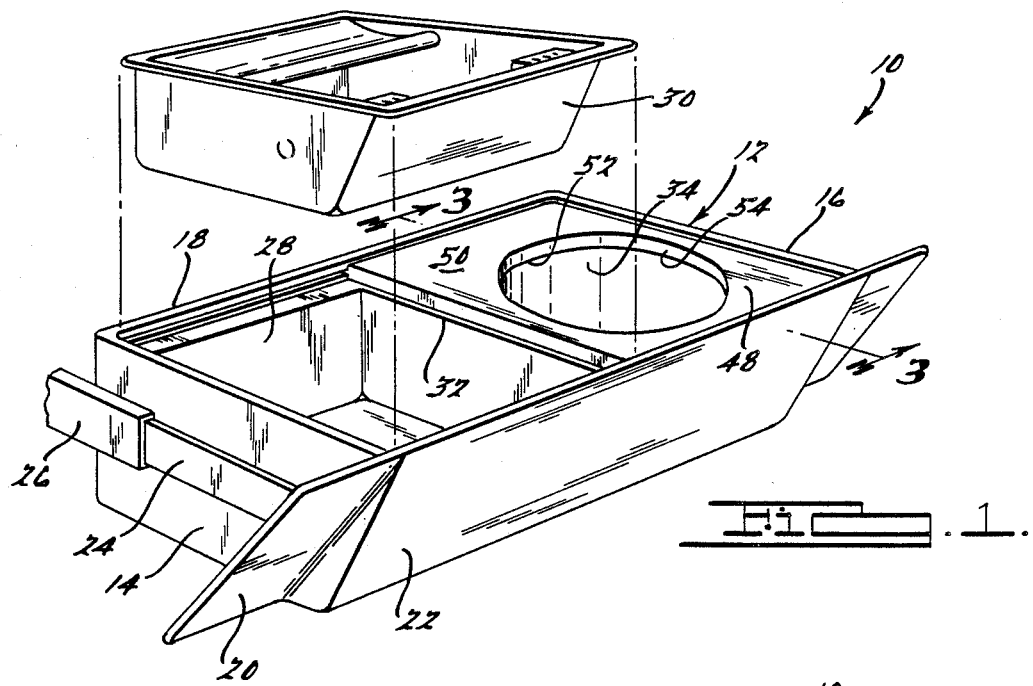
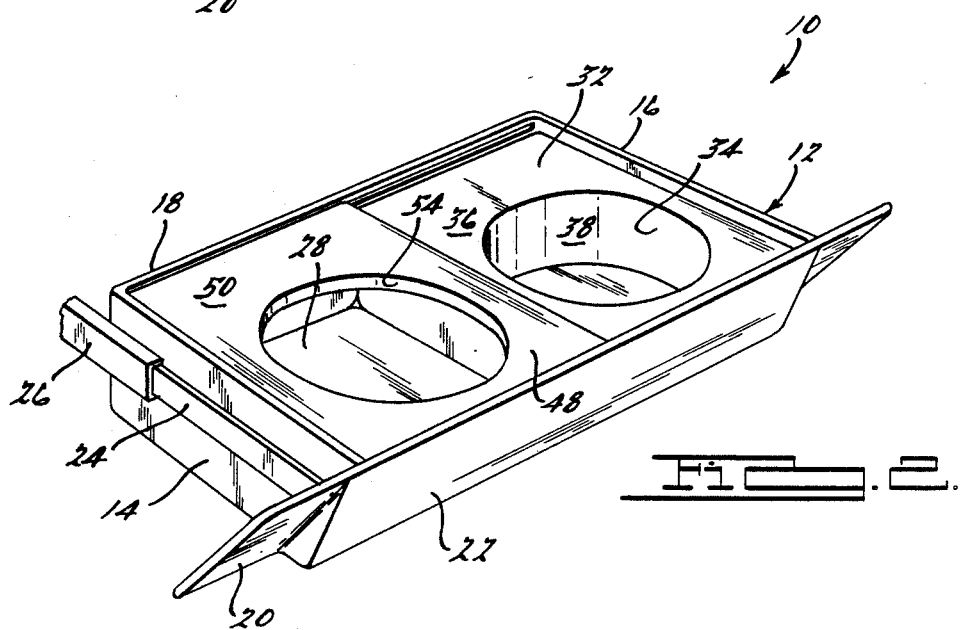
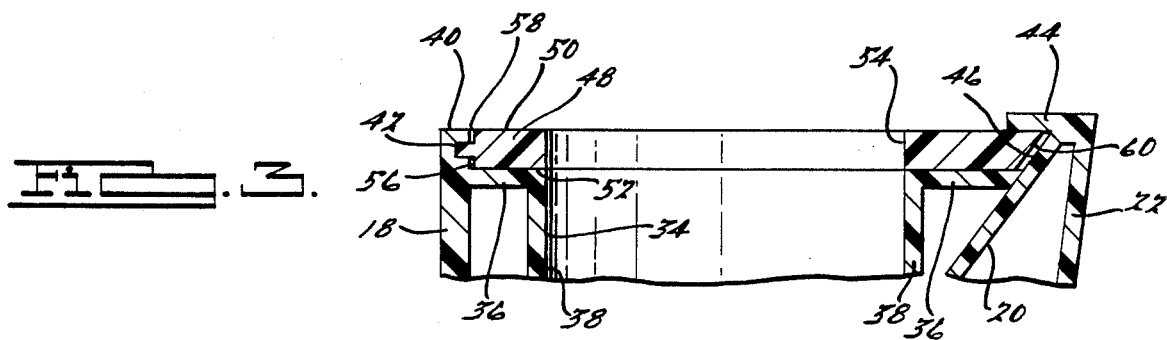

CUP HOLDER

BACKGROUND OF THE INVENTION

1. Field of the Invention

The present invention relates generally to cup holders, and more particularly to, a cup holder adapted for use in a vehicle.

2. Description of Related Art

Currently, ash receptacles or ashtrays have been developed for use in vehicles such as an automotible. Typically, the ashtray is mounted in a pull-out retainer of a dashboard or console in a passenger compartment of the vehicle.

Prior art devices have been constructed for holding a conventional cup or the like by cooperating with the ashtray. An example of such a device is disclosed in U.S. Pat. No. 4,286,742 to Pellegrino. This patent discloses a cup holder which is adapted to be inserted into the interface between the ashtray or retainer and dashboard and extends forward into the passenger compartment. The cup holder is a plate having an aperture for receiving the cup.

One problem with the above patented device is that it extends forward beyond the ashtray retainer into the passenger compartment which is undesireable. Another problem is that the device is supported in a cantilevered manner between the ashtray retainer and dashboard. A further problem is that the device can hold or support only one cup or the like.

It is, therefore, one object of the present invention to provide a cup holder that does not extend forward beyond the ashtray retainer into the passenger compartment of the vehicle.

It is another object of the present invention to provide a cup holder that cooperates with the ashtray retainer and is not supported in a cantilevered manner.

It is a further object of the present invention to provide a cup holder which holds or supports more than one cup.

SUMMARY OF THE INVENTION

Accordingly, the present invention is a cup holder adapted for use in a vehicle. The cup holder includes a retainer having a cavity adapted to receive an ashtray and means forming front and rear laterally spaced tracks. The cup holder also includes a plate member having front and rear edges and a cup receiving means. The front and rear edges further include means for operatively engaging the front and rear tracks of the retainer for movement between a first position adjacent the ashtray and a second position over the cavity when the ashtray is removed.

One advantage of the present invention is that the ashtray of the vehicle may be removed and the present invention substituted in its place to receive and hold a cup or the like. As a result, the present invention does not extend forward beyond the ashtray retainer into the passenger compartment. Another advantage of the present invention is that it is fully supported on both ends by the ashtray retainer, eliminating any cantilevered manner of support. A further advantage of the present invention is that at least a pair of cups or the like may be held or supported.

Other advantages of the present invention will be readily appreciated as the same becomes better understood after reading the following description in connection with the accompanying drawings.

BRIEF DESCRIPTION OF THE DRAWINGS

FIG. 1 is a perspective view of a cup holder constructed in accordance with the principles of the present invention with an ashtray exploded in the view.

FIG. 2 is a view similar to FIG. 1 with the ashtray removed and a plate member in the location of the ashtray.

FIG. 3 is a sectional view taken along 3—3 of FIG. 1.

DESCRIPTION OF THE PREFERRED EMBODIMENT

Referring to FIG. 1, a cup holder 10, according to the present invention is shown. The cup holder 10 is adapted for use in a vehicle such as an automobile. The cup holder 10 includes a retainer, generally indicated at 12. The retainer 12 is generally rectangular in shape and has a pair of lateral sides 14 and 16 and a rear longitudinal side 18. The sides 14, 16 and 18 are generally rectangular and planar in shape and preferably integral to form three sides of the retainer 12. The retainer 12 also has a generally rectangular and planar inclined face plate 20 for the forward longitudinal side of the retainer 12. The face plate 20 includes an axially outward and vertically extending portion 22 adapted to be grasped by an operator for a function to be described. A pair of arms 24 extend longitudinally along the lateral sides 14 and 16 of the retainer 12 for telescoping engagement with a pair of tubular tracks 26 attached to a housing (not shown) of a console or dashboard (not shown) in the passenger compartment of the vehicle.

The retainer 12 further includes a generally rectangular first cavity 28 for receiving a removable ashtray 30. The ashtray 30 is conventional and well known in the art. The retainer 12 also includes a raised platform 32 laterally adjacent the first cavity 28. The raised platform 32 is generally rectangular in shape and includes a second cavity 34 formed therein. The second cavity 34 is generally circular in shape and is adapted to receive a conventional cup or the like (not shown).

Referring to FIGS. 2 and 3, the raisedplatform 32 includes an upper horizontal wall 36 and a generally annular vertical wall 38 forming the second cavity 34. Preferably, the upper horizontal wall 36 is integrally formed with the rear longitudinal side 18 and the vertical wall 38. The upper horizontal wall 36 is disposed a distance below an upper surface 40 of the rear longitudinal side 18. The rear longitudinal side 18 includes a longitudinally extending slot or groove 42 formed therein between the upper horizontal wall 36 and the upper surface 40 thereof. The face plate 20 and vertically extending portion 22 extend above the upper horizontal wall 36 and include an integrally formed flange 44 extending longitudinally therealong and rearwardly toward the rear longitudinal side 18. The flange 44, horizontal wall 36 and face plate 20 form a longitudinally extending groove or track 46.

The cup holder 10 also includes a plate member 48 moveable between a first and second position. The plate member 48 is generally rectangular and planar in shape and has a top surface 50 and a bottom surface 52. The plate member 48 also includes an aperture 54 extending through the top and bottom surfaces 50 and 52. The aperture 54 has a generally circular shape similar to that of the second cavity 34. The plate member 48 also has a rear or first edge 56 with a generally rectangular and laterally and longitudinally extending tab 58 disposed in the corresponding slot 42 of the rear longitudinal wall 18. The plate member 48 also includes a forward or second edge 60 having an inclined outer surface which is disposed in the track 46.

In operation, the plate member 48 is disposed in a first position directly over the platform 32 as shown in FIG. 1 such that the aperture 54 and second cavity 34 are aligned. The ashtray 30 is typically disposed in the first cavity 28 and the retainer 12 may be disposed in the housing. The operator grasps portion 22 and pulls or moves the retainer 12 forward. In this arrangement, the cup holder 10 is adapted to receive a cup or the like by placing it in the aperture 54 of the plate member 48.

If another cup is desired to be held, the ashtray 30 may be removed. The plate member 48 is then slid or moved to a second position directly over the first cavity 28 as shown in FIG. 2. In this arrangement, a first cup (not shown) may be disposed in the second cavity 34 and held or supported there. A second cup (not shown) may be disposed in the aperture 54 of the plate member 48. Thus, two cups may be held by the present invention.

Accordingly, the cup holder 10 of the present invention fulfills two customer requirements without additional components being required outside of the manufacturer. The customer can determine which mode, smoke or non-smoker, will be used without dealer assistance, added parts or costs. For example, a smoker leaves the ash receptacle or ashtray 30 in place and utilizes the ashtray 30 and only holds or supports one cup simultaneously. Whereas, a non-smoker simply removes the ashtray 30 and slides the plate member 48 over the first cavity 28 for dual cup holder functions simultaneously.

The present invention has been described in an illustrative manner. It is to be understood that the terminology which has been used is intended to be in the nature of words of description rather than of limitation.

Obviously, many modifications or variations of the present invention are possible in light of the above teachings. Therefore, within the scope of the appended claims, the present invention may be practiced otherwise than as specifically described.

What is claimed is:

1. A convertible retainer mounted on an automotive vehicle console for movement into and out of a console housing, said convertible retainer adapted for ready conversion between a first combined ashtray and single cup holder mode and a second dual cup holder mode, comprising:

a generally rectangular-shaped retainer having a pair of lateral sides, a rear longitudinal side, and a forward longitudinal side, said retainer defining a generally rectangular first cavity adapted to receive a removable ashtray therein and a laterally adjacent raised rectangular-shaped horizontally disposed platform;

said raised platform including an upper horizontal wall and a generally annular vertical wall forming a second cylindrically shaped cavity disposed in the center of said horizontal wall adapted to receive a beverage cup therein, said second cavity having its principal axis disposed vertically;

said retainer rear and forward sides having means forming rear and forward laterally spaced longitudinally extending opposed tracks, respectively, such that each said rear and forward track being coextensive with and adjacent to the upper portion of its associated side at a predetermined elevation above said raised platform horizontal wall;

a rectangular plate member having front and rear edges, two opposing sides, and top and bottom planar surfaces, said plate member having a circular aperture extending therethrough said circular aperture having its center adjacent the center of said plate member and adapted to receive a beverage cup therein;

said plate member front and rear edges including means operatively engaging said forward and rear opposed tracks, respectively, for lateral sliding movment of said plate member between a combined ashtray and single cup holder mode overlying said platform horizontal wall and a second dual cup holder mode overlying said first cavity;

whereby with said convertible retainer moved out of the console and with plate member in said first mode overlying said platform horizontal wall, such that said second cavity principal axis is aligned with said plate member circular aperture center, wherein said plate member circular aperture and said second cavity are adapted to conjointly receive a beverage cup therein; and whereby with said convertible retainer moved out of the console and with said retainer in said second dual cup holder mode with said ashtray removed from said first cavity and said plate member overlying said first cavity, such that said plate member circular aperture together with said first cavity is adapted to receive a first beverage cup therein and said second cavity is adapted to receive a second beverage cup therein wherein the first and second beverage cups may be supported in a side-by-side manner.

2. The convertible retainer as set forth in claim 1, wherein said plate member having a lateral dimension substantially one-half the lateral dimension between said retainer side walls.

3. The convertible retainer as set forth in claim 1, wherein said rear track in the form of a longitudinally extending groove formed in said rear side between said upper horizontal wall and the upper end of said rear side, and said forward track in the form of a longitudinally extending groove formed in said forward side between said upper horizontal wall and the upper end of said front side such that said rear and forward grooves are in opposed co-extensive relation, and said plate member rear edge engaging means in the form of a laterally and longitudinally extending tab adapted to be slidably disposed in said rear groove and said plate member forward edge in the form of a forwardly and longitudinally extending portion adapted to be slidably disposed in said forward groove.

4. The convertible retainer as set forth in claim 3, wherein said retainer forward side is in the form of a rectangular and planar inclined face plate, said face plate including an axially outboard and generally vertically extending portion adapted to be grasped by an operator, and face plate generally vertically extending portion extending above said platform horizontal wall including an integrally formed flange extending longitudinally therealong and rearwardly toward said rear longitudinal side, whereby said flange, said platform horizontal wall and said face plate form said forward longitudinally extending groove.

* * * * *